(12) United States Patent
Shen (10) Patent No.: US 11,313,714 B2
(45) Date of Patent: Apr. 26, 2022

(54) DEVICE AND METHOD FOR MEASUREMENT OF ULTRASONIC TRANSIT TIMES

(71) Applicant: Spire Metering Technology LLC, Marlborough, MA (US)

(72) Inventor: Chang Shen, Acton, MA (US)

( * ) Notice: Subject to any disclaimer, the term of this patent is extended or adjusted under 35 U.S.C. 154(b) by 116 days.

(21) Appl. No.: 16/460,650

(22) Filed: Jul. 2, 2019

(65) Prior Publication Data

US 2019/0323878 A1 Oct. 24, 2019

Related U.S. Application Data

(63) Continuation of application No. 13/646,665, filed on Oct. 6, 2012, now abandoned.

(51) Int. Cl.
*G01F 25/00* (2006.01)
(52) U.S. Cl.
CPC .................... *G01F 25/00* (2013.01)
(58) Field of Classification Search
CPC ...................................................... G01F 25/00
See application file for complete search history.

(56) References Cited

U.S. PATENT DOCUMENTS

| | | | |
|---|---|---|---|
| 4,934,193 A | 6/1990 | Romano | |
| 5,748,504 A * | 5/1998 | Fletcher-Haynes | ..... G01F 1/662 702/100 |
| 6,928,369 B2 | 8/2005 | Kishimoto et al. | |
| 2004/0107779 A1* | 6/2004 | Kishimoto | .............. G01F 1/667 73/861.29 |

* cited by examiner

*Primary Examiner* — Xin Y Zhong
(74) *Attorney, Agent, or Firm* — Kriegsman & Kriegsman (57) ABSTRACT

A device for measurement of ultrasonic wave transit times of an ultrasonic flow sensor consists of: 1) a synchronization signal generator, 2) a reference pulse generator, 3) a sine wave generator, 4) an analog signal amplifier, 5) a comparator, 6) a plurality of latch circuits, 7) a digital adder, 8) an integrator, 9) an A/D converter. 10) a master counter, 11) a plurality of edge counters, and 12) an arithmetic circuit. The device measures the ultrasonic wave transit times using a method of averaging the ultrasonic wave arriving limes at different measuring points (triggering point). This method has less dependency on triggering threshold level and the ultrasonic signal amplitude, and thus has less dependency on threshold drift, threshold stability, system gain fluctuation, electronic noise and signal amplitude variations. As a result, the method can greatly improve the velocity measurement accuracy and system robustness of an ultrasonic flow sensor.

11 Claims, 9 Drawing Sheets

DEVICE AND METHOD FOR MEASUREMENT OF ULTRASONIC TRANSIT TIMES

CROSS-REFERENCE TO RELATED APPLICATIONS

The present application is a continuation of presently-pending U.S. patent application Ser. No. 13/646,665, filed Oct. 6, 2012, the disclosure of which is incorporated herein by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

FIELD OF THE INVENTION

The present disclosure relates to a device for measuring ultrasonic wave transit times from the transmitter to the receiver of an ultrasonic flow sensor.

BACKGROUND OF THE INVENTION

The statements in this section merely provide background information related to the present disclosure and may not constitute prior art.

An ultrasonic flow sensor measures the average velocity of liquid or gaseous media by means of ultrasonic transducers based on the principle that the transit time of an ultrasonic wave from the transmitter of a transducer to the corresponding receiver is determined by the fluid velocity and the ultrasonic wave propagating direction. Normally, a pair of transducers is used, one is installed in upstream and the other is installed in downstream. Each transducer can be used as a transmitter or a receiver. One ultrasonic wave is transmitted from the upstream transducer to the downstream transducer. The second ultrasonic pulse is transmitted from the downstream transducer to the upstream transducer. The transit time in each direction is measured by an electronic device. The difference of the two transit-time data is proportional to flow velocity. It is then used to calculate the average flow velocity of the fluid.

In conventional electronic devices of an ultrasonic flow sensor, the ultrasonic wave transit time is measured by a time counter to count a reference clock using the following method. 1) Sending ultrasonic pulse wave to the transmitter, starting the timer counter. 2) Monitoring the ultrasonic signal received by the receiver, when the received signal becomes higher than the predefined threshold value, immediately stopping the time counter, and recording the arriving time. This arriving time is treated as the transmit time.

In the above approach, an analog integrator may be used to measure the residual time from the counter stopping moment to the rising edge of the next cycle of the reference clock. This residual time is then combined with the previous transit-time to obtain a transit-time with higher accuracy.

However, this measurement method is susceptible to electronic noise and condition variation. Both the strength of the received signal and the predefined threshold value are subject to electronic noise. In addition, the strength of the received signal varies with the fluid properties such as temperature, velocity, turbulence, solids concentration, etc. As a result, the measured transit time changes not only with flow velocity, but with the fluid properties and electronic noise level. This significantly reduces the velocity measurement accuracy and stability of an ultrasonic flow sensor.

BRIEF SUMMARY OF THE INVENTION

Further areas of applicability will become apparent from the description provided herein. It should be understood that the description and specific examples are intended for purposes of illustration only and are not intended to limit the scope of the present disclosure.

The object of the present invention is to provide an electronic device which can accurately and reliably measure the transit times from the transmitter to the receiver and hence improving the velocity measurement accuracy of an ultrasonic flow sensor.

In more detail the present invention provides an electronic device for measurement of ultrasonic wave transit times of an ultrasonic flow sensor consists of: 1) a synchronization signal generator, 2) a reference pulse generator, 3) a sine wave generator, 4) an analog signal amplifier, 5) a comparator, 6) a plurality of latch circuits, 7) a digital adder, 8) an integrator, 9) an A/D converter, 10) a master counter, 11) a plurality of edge counters, and 12) an arithmetic circuit (microprocessor). The device measures the ultrasonic wave transit times using a threshold level to trigger both the rising edge and falling edge of the received ultrasonic signal, and using a method of averaging the ultrasonic wave arriving times at different measuring points. This method has less dependency on the threshold level and the ultrasonic signal amplitude, thus, has less dependency on threshold drift threshold stability, system gain fluctuation, electronic noise and signal amplitude variations. As a result this method can greatly improve the velocity measurement accuracy and system robustness of an ultrasonic flow sensor.

BRIEF DESCRIPTION OF THE SEVERAL VIEWS OF THE DRAWINGS

The drawings described herein are for illustration purposes only and are not intended to limit the scope of the present disclosure in any way.

DETAILED DESCRIPTION OF THE INVENTION

The following description is merely exemplary in nature and is not intended to limit the present disclosure, application, or uses. It should be understood that throughout the drawings, corresponding reference numerals indicate like or corresponding parts and features.

Figure 1:
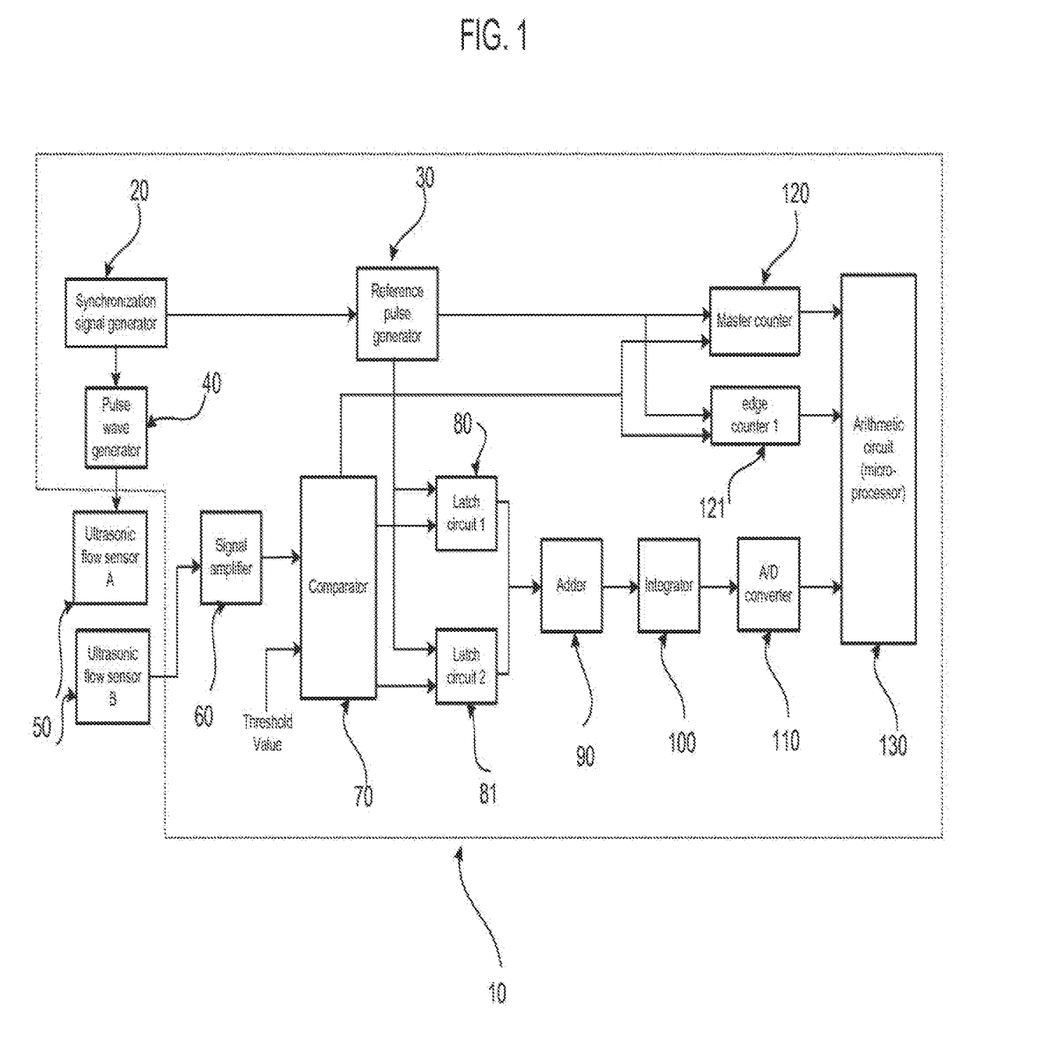
FIG. 1 shows a block diagram of the first embodiment of a device for measurement of the ultrasonic wave transit times of the present disclosure.

FIG. 1 illustrates the first embodiment of an electronic device for measuring the ultrasonic wave transit times of the present disclosure. In this first embodiment, the device 10 consists of a synchronization signal generator 20, a reference pulse generator 30, a sine wave generator 40, an analog signal amplifier 60, a comparator 70, two latch circuits 80 and 81, a digital adder 90, an integrator 100, an A/D converter 110, a master pulse counter 120, an edge counter 121, and an arithmetic circuit 130.

Figure 2:
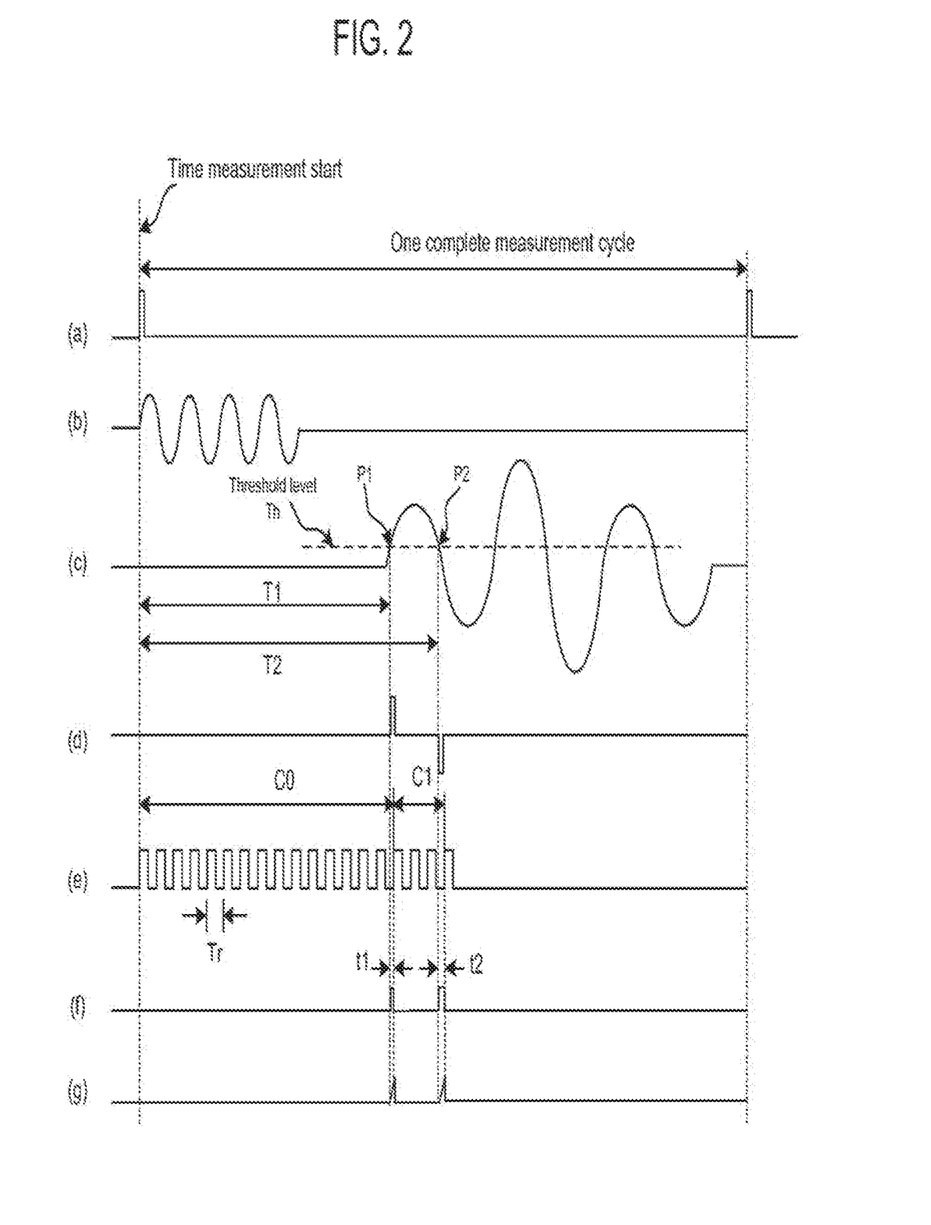
FIG. 2 shows the operational waveform diagram of the device shown in FIG. 1.

Referring to FIGS. 1 and 2, the synchronization signal generator 20 outputs a pulse shown in FIG. 2a. This pulse is used to perform the following functions: 1) initiating the measurement cycle, 2) triggering the sine wave generator 40 to start sending sine wave signal to the transmitter of the ultrasonic flow sensor 50, 3) triggering the reference pulse generator 30 to start generating high frequency clock signal, and 4) commanding the master counter 120 to start counting the reference pulses.

Referring to FIGS. 1 and 2, after receiving the synchronization pulse, the reference pulse generator 30 starts sending high frequency clock signal to: 1) the master counter 120, 2) the edge counter 121, and 3) the two latch circuits 80-81, as shown in FIG. 2e.

Referring to FIGS. 1 and 2, after receiving the synchronization pulse, the sine wave generator 40 starts sending sine wave signals (FIG. 2b) to the transmitter of the ultrasonic flow sensor 50. After certain period of time delay, the sine wave signal arrives at the receiver of the ultrasonic flow sensor 50 with modulated amplitude, as shown in FIG. 2c.

Referring to FIGS. 1 and 2, the AC-coupled analog signal amplifier 60 amplifies the output signal from the receiver of the ultrasonic flow sensor 50.

Referring to FIGS. 1 and 2, the comparator 70 compares the signal received from the analog signal amplifier 60 with the predefined threshold value. When the received signal becomes higher than the threshold value, it outputs a positive pulse. On the other hand, when the received signal becomes lower than the threshold value, it outputs a negative pulse, as shown in FIG. 2d.

Referring to FIGS. 1 and 2, after receiving the positive pulse from the comparator 70, the master counter 120 stops counting the reference clock, as shown in FIG. 2e. The time interval, C0, measured by the master counter 120 can be described by the equation:

$$C0=NTr.$$

Where N is the output of the mater counter 120, Tr is the period of the reference clock. The master counter 120 can only count complete clock cycles, its output N is a positive integer number, any time less than one clock cycle will not be counted.

Referring to FIGS. 1 and 2, after receiving the positive pulse from the comparator 70, the edge counter 121 starts counting the reference pulses. After receiving the negative pulse from the comparator 70, the edge counter 121 stops counting the pulses, as shown in FIG. 2e. The time interval, C1, measured by the edge counter 121 can be described by the equation:

$$C1=N1Tr.$$

Where N1 is the output of the first counter 121. Similar to the master counter, the edge counter 121 can only count complete clock cycles, its output N1 is a positive integer number, any time less than one clock cycle will not be counted.

Referring to FIGS. 1 and 2, the latch circuit 80 is used to measure the time interval t1, between the positive pulse from the comparator 70 and the first upward edge of the reference clock fed into the edge counter 121, as shown in FIG. 2f.

Referring to FIGS. 1 and 2, the latch circuit 81 is used to measure the time interval t2, between the negative pulse from the comparator 70 and the next upward edge of the reference clock after the edge counter 121 is stopped, as shown in FIG. 2f.

Referring to FIG. 1, the outputs of the latch circuits 80 and 81 are fed into the adder circuit 90. They are added together, and then output to the integrator circuit 100.

Referring to FIGS. 1 and 2, since the t1 and t2 time intervals from the latch circuits 80 and 81 are very short, the integrator circuit 100 is used to convert these short pulses to analog exponential waves, as shown in FIG. 2g.

Referring to FIG. 1, the analog signal from the integrator 100 is then converted to a digital value by the A/D converter 110, and fed into the arithmetic circuit 130.

Referring to FIG. 2, the arriving time of the ultrasonic wave, T1, measured at the first measurement point P1, can be described by the equation:

$$T1=C0-t1=NTr-t1$$

Referring to FIG. 2, the arriving time of the ultrasonic wave, T2, measured at the second measurement point P2, can be described by the equation:

$$T2-C0+C1-t2=(N+N1)Tr-t2.$$

Referring to FIG. 2, the arithmetic circuit 130 calculates the ultrasonic wave transit time based on the following formula:

$$Tm=(T1+T2)/2-NTr*N1Tr/2-(t1+t2)/2.$$

Figure 3A:
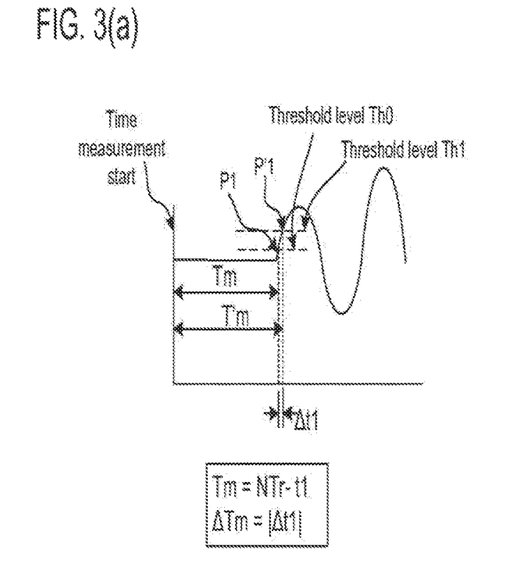
FIG. 3(a) illustrates the transit time measurement error caused by the threshold fluctuation of prior art.
Figure 3B:
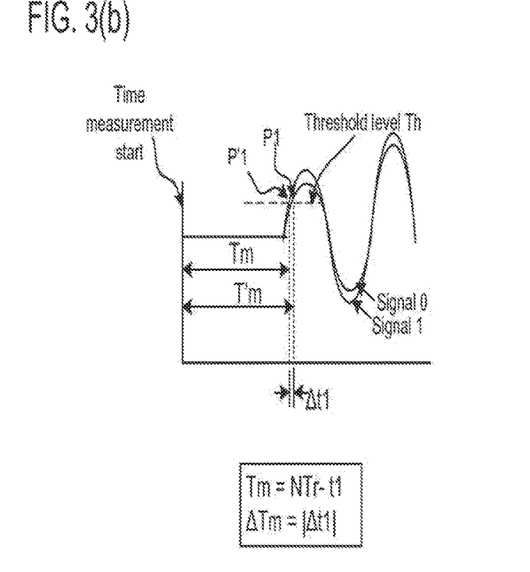
FIG. 3(b) illustrates the transit time measurement error caused by the signal amplitude fluctuation of prior art.

Referring to FIGS. 3(a) and (b), the ultrasonic wave transit time with prior art is based on the following formula:

$$Tm=NTr-t1.$$

Obviously, the transit-time Tm obtained by prior art differs from the one obtained by the first embodiment of the present disclosure by N1Tr/2. This difference does not have any impact on the flow measurement, because the flow rate is calculated based on transit-time difference between upstream Tm and downstream Tm. In addition, the difference can be calibrated so to have accurate transit-time measurement.

FIG. 3 (a) illustrates the transit time measurement error caused by the threshold level fluctuation of prior art. In this case the time measurement error is:

$$\Delta Tm = |\Delta t1|.$$

FIG. 3 (b) illustrates the transit time measurement error caused by signal amplitude fluctuation of prior art. In this case the time measurement error is:

$$\Delta Tm = |\Delta t1|.$$

Figure 4A:
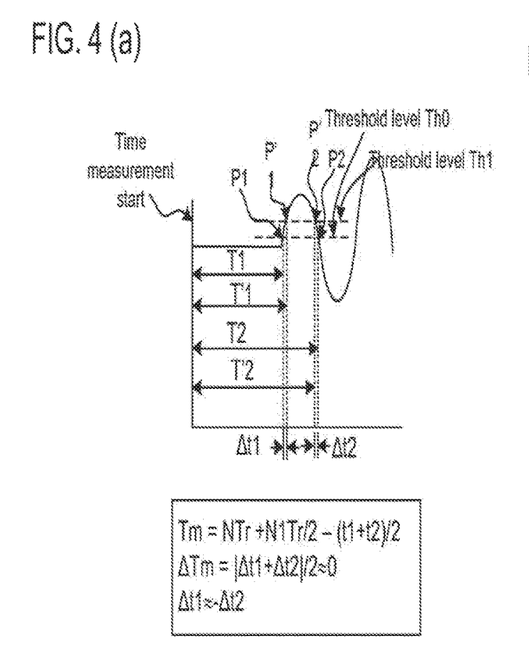
FIG. 4(a) illustrates the transit time measurement error reduction of the first embodiment of the present disclosure against threshold fluctuation interference.

FIG. 4(a) illustrates the transit time measurement error caused by threshold fluctuation of the first embodiment of the present disclosure. In this case the time measurement error is:

$$\Delta Tm = |\Delta t1 + \Delta t2|/2.$$

Figure 4B:
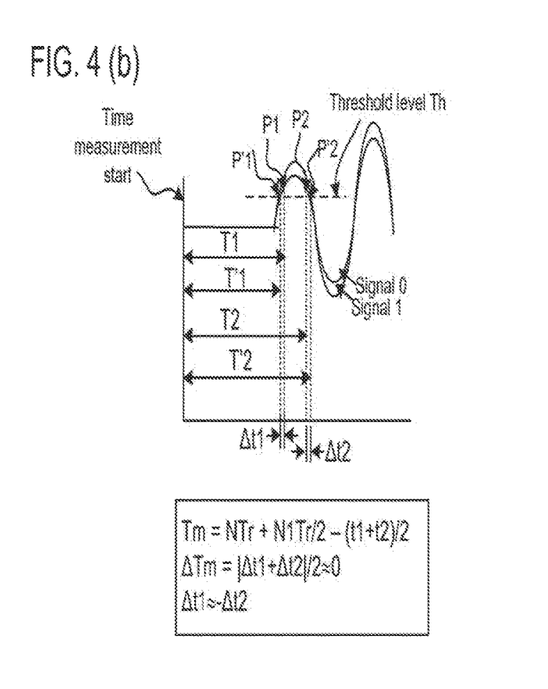
FIG. 4(b) illustrates the transit time measurement error reduction of the first embodiment of the present disclosure against signal amplitude fluctuation interference.

FIG. 4(b) illustrates the transit time measurement error cause by signal amplitude fluctuation of the first embodiment of the present disclosure. In this case the time measurement error is:

$$\Delta Tm = |\Delta t1 + \Delta t2|/2.$$

It is noted from the FIGS. 4(a) and (b) that $\Delta t1$ and $\Delta t2$ change in opposite direction in similar magnitude, when $\Delta t1$ increases, $\Delta t2$ decreases, and vice versa, i.e.:

$$\Delta t1 \approx -\Delta t2$$

As a result, their average, $\Delta Tm$, is always smaller than $|\Delta t1|$. In effect, $$\Delta Tm \approx 0.$$

This indicates that the transit-time obtained by the present invention does not change with threshold drifting or signal amplitude variation. By contract, the transit-time obtained by prior art is sensitive to threshold drifting and signal amplitude variation. As a result of this, the transit time measurement accuracy and reliability are greatly improved by using the method of the present disclosure compared to the method of prior art.

Figure 5:
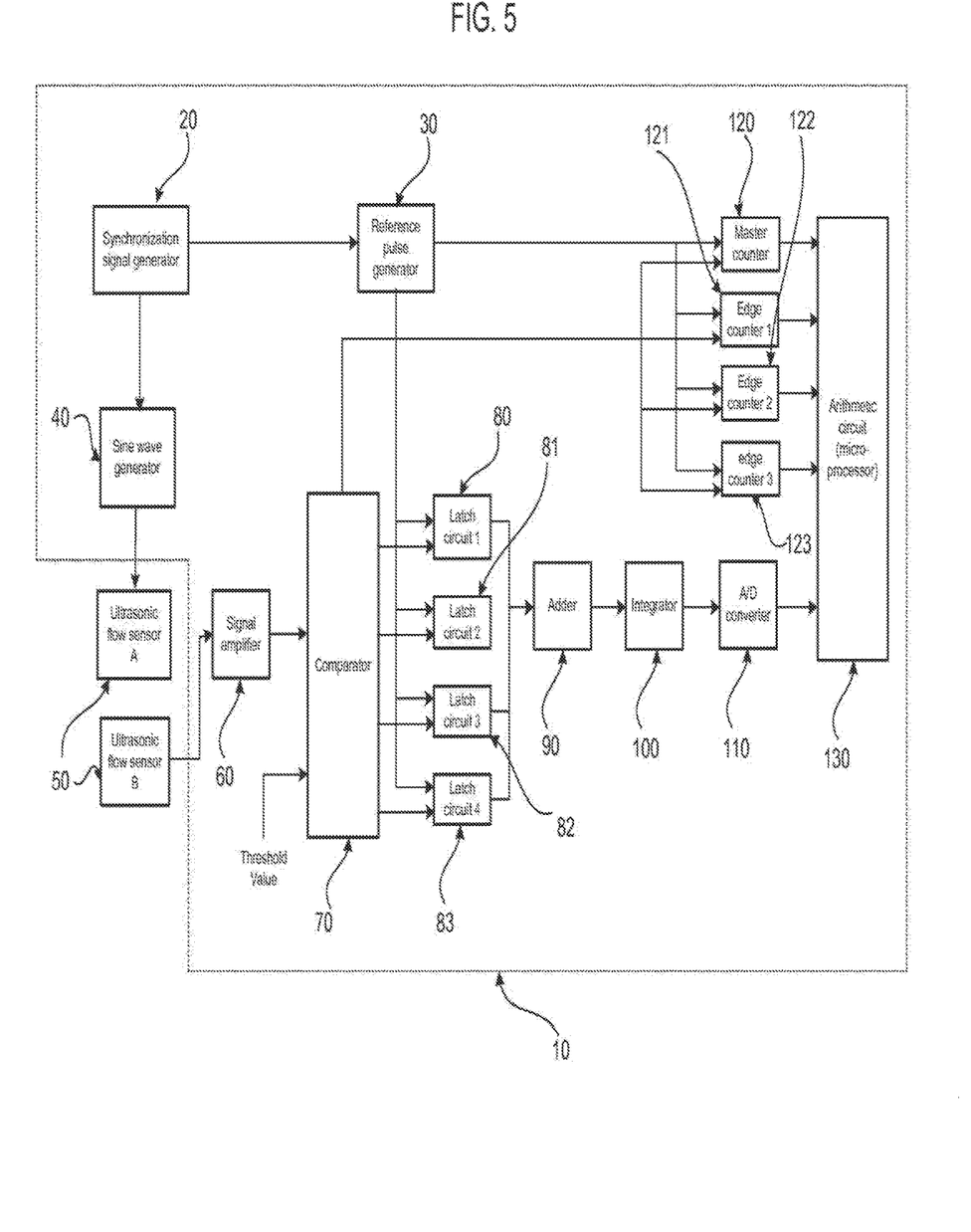
FIG. 5 shows a block diagram of the second embodiment of a device for measurement of the ultrasonic wave transit times of the present disclosure.

FIG. 5 illustrates the second embodiment of an electronic device for measuring the ultrasonic wave transit times of the present disclosure. In this second embodiment, the device 10 consists of a synchronization signal generator 20, a reference pulse generator 30, a sine wave generator 40, an analog signal amplifier 80, a comparator 70, four latch circuits 80-83, a digital adder 90, an integrator 100, an A/D converter 110, a master counter 120, three edge counters 121-123, and an arithmetic circuit 130.

Figure 6:
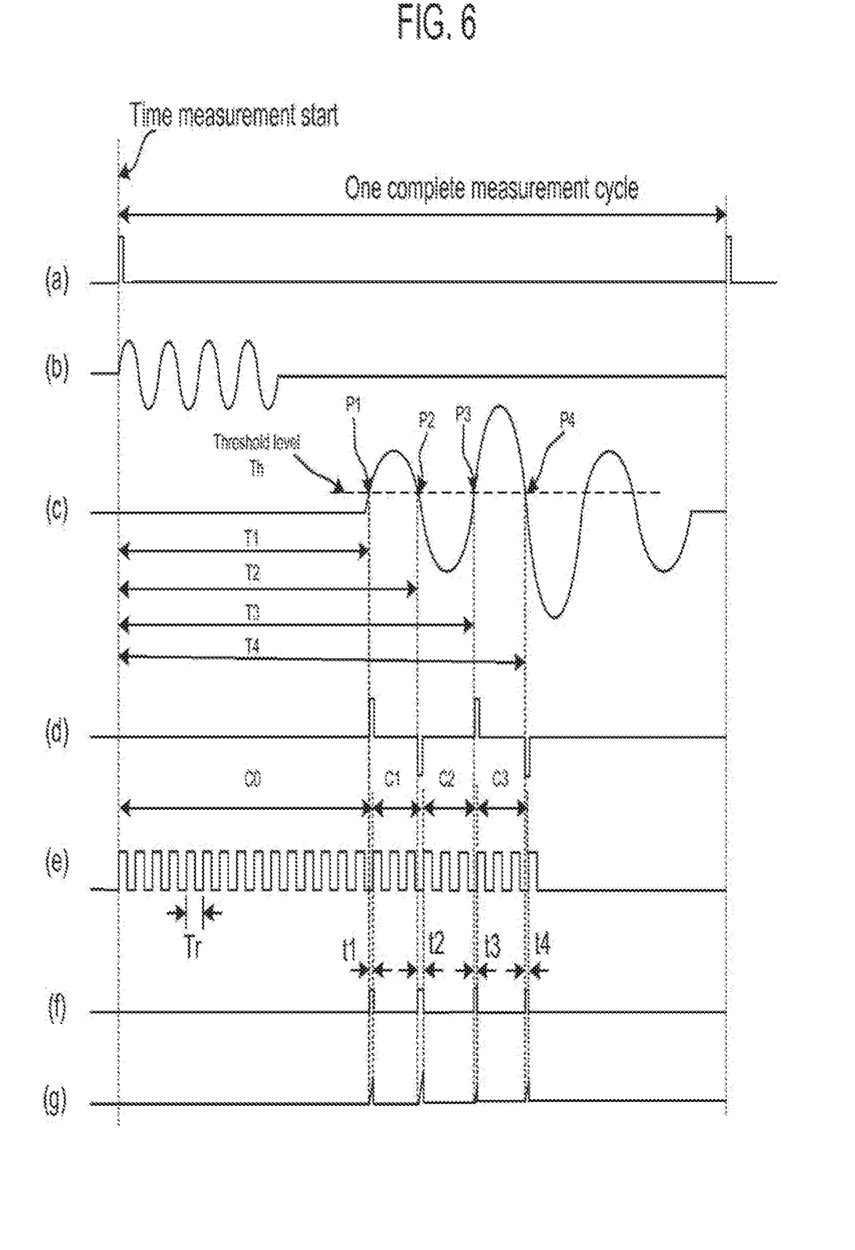
FIG. 6 shows the operational waveform diagram of the device shown in FIG. 5.

Referring to FIGS. 5 and 6, the synchronization signal generator 20 outputs a pulse shown in FIG. 6a. This pulse is used to perform the following functions: 1) initiating the measurement cycle, 2) triggering the sine wave generator 40 to start sending sine wave signal to the transmitter of the ultrasonic flow sensor 50, 3) triggering the reference pulse generator 30 to start generating high frequency clock signal, and 4) commanding the master counter 120 to start counting the reference clock cycles.

Referring to FIGS. 5 and 6, after receiving the synchronization pulse, the reference pulse generator 30 starts sending high frequency clock signal to: 1) the master counter 120, 2) the edge counters 121-123, and 3) the latch circuits 80-83, as shown in FIG. 6e.

Referring to FIGS. 5 and 6, after receiving the synchronization pulse, the sine wave generator 40 starts sending sine waves (FIG. 6b) to the transmitter of the ultrasonic flow sensor 50. After certain period of time delay, the sine wave signal arrives at the receiver of the flow meter with modulated amplitude, as shown in FIG. 6c.

Referring to FIGS. 5 and 6, the AC-coupled analog signal amplifier 60 amplifies the output signal from the receiver of the ultrasonic flow sensor 50.

Referring to FIGS. 5 and 6, the comparator 70 compares the signal received from the analog signal amplifier 60 with the predefined threshold value. When the received signal becomes higher than the threshold value, it outputs a positive pulse. On the other hand, when the received signal becomes lower than the threshold value, it outputs a negative pulse, as shown in FIG. 6d.

Referring to FIGS. 5 and 6, after receiving the positive pulse from the comparator 70, the master counter 120 stops counting the reference clock, as shown in FIG. 6e. The time interval, C0, measured by the master counter 120 can be described by the equation:

$$C0 = NTr,$$

where N is the output of the mater counter 120, Tr is the period of the reference clock. The master counter 120 can only count complete clock cycles, its output N is a positive integer number, any time less than one clock cycle will not be counted.

Referring to FIGS. 5 and 6, after receiving the first positive pulse from the comparator 70, the edge counter 121 starts counting the reference clock. After receiving the first negative pulse from the comparator 70, the edge counter 121 stops counting the clock, as shown in FIG. 6e. The time interval, C1, measured by the edge counter 121 can be described by the equation:

$$C1 = N1 Tr,$$

where N1 is the output of the counter 121. Similar to the master counter 120, the edge counter 121 can only count complete clock cycles, its output N1 is a positive integer number, any time less than one clock cycle will not be counted.

Referring to FIGS. 5 and 6, after receiving the first negative pulse from the comparator 70, the edge counter 122 starts counting the reference clock. After receiving the second positive pulse from the comparator 70, the edge counter 122 stops counting the clock, as shown in FIG. 6e. The time interval, C2, measured by the edge counter 122 can be described by the equation:

$$C2 = N2 Tr,$$

where N2 is the output of the counter 122. Similar to the master counter 120, the edge counter 122 can only count complete clock cycles, its output N2 is a positive integer number, any time less than one cycle pulse will not be counted.

Referring to FIGS. 5 and 6, after receiving the second positive pulse from the comparator 70, the edge counter 123 starts counting the reference clock. After receiving the second negative pulse from the comparator 70, the edge counter 123 stops counting the reference clock, as shown in FIG. 6e. The time interval, C3, measured by the edge counter 123 can be described by the equation:

$$C3 = N3 Tr,$$

where N3 is the output of the counter 123. Similar to the master counter 120, the edge counter 123 can only count complete clock cycles, its output N3 is a positive integer number, any time less than one clock cycle will not be counted.

Referring to FIGS. 5 and 6, the latch circuit 80 is used to measure the time interval t1 between the first positive pulse from the comparator 70 and the first upward edge of the reference clock fed into the edge counter 121, as shown in FIG. 6f. Since time interval t1 is less than one complete reference clock, it cannot be measured by the master counter 120.

Referring to FIGS. 5 and 6, the latch circuit 81 is used to measure the time interval t2 between the first negative pulse from the comparator 70 and the first upward edge of the reference clock fed into the edge counter 122, as shown in FIG. 6f. Since time interval t2 is less than one complete reference clock, it cannot be measured by the edge counter 121.

Referring to FIGS. 5 and 6, the latch circuit 82 is used to measure the time interval t3 between the second positive pulse from the comparator 70 and the first upward edge of the reference clock fed into the edge counter 123, as shown in FIG. 6f. Since time interval t3 is less than one complete reference clock, it cannot be measured by the edge counter 122.

Referring to FIGS. 5 and 6, the latch circuit 83 is used to measure the time interval t4 between the second negative pulse from the comparator 70 and the next upward edge of the reference clock after the edge counter 123 is stopped, as shown in FIG. 6f. Since time interval t4 is less than one complete reference clock, it cannot be measured by the edge counter 123.

Referring to FIG. 5, the outputs of latch circuits 80-83 are fed into the adder circuit 90. They are added together and then output to the integrator circuit 100.

Referring to FIGS. 5 and 6, since the time intervals t1-t4 from the latch circuits 80-83 are very short, the integrator circuit 100 is used to convert these short pulses to triangular waves, as shown in FIG. 2g.

Referring to FIG. 5, the analog signal from the integrator 100 is then converted to a digital value by the A/D converter 110, and fed into the arithmetic circuit 130.

Referring to FIG. 6, the arriving time of the ultrasonic wave, T1, measured at the first measurement point P1, can be described by the equation:

$$T1 = C0 - t1 = NTr - t1.$$

Referring to FIG. 6, the arriving time of the ultrasonic wave, T2, measured at the second measurement point P2, can be described by the equation:

$$T2 = C0 + C1 - t2 = (N+N1)Tr - t2.$$

Referring to FIG. 6, the arriving time of the ultrasonic wave, T3, measured at the third measurement point P3, can be described by the equation:

$$T3 = C0 + C1 + C2 - t3 = (N+N1+N2)Tr - t3.$$

Referring to FIG. 6, the arriving time of the ultrasonic wave, T4, measured at the fourth measurement point P4, can be described by the equation:

$$\begin{aligned} T4 &= C0 + C1 + C2 + C4 - t4 \\ &= T3 + C3 + t3 - t4 \\ &= (N + N1 + N2 + N3)Tr - t4. \end{aligned}$$

Referring to FIG. 5, the arithmetic circuit 130 calculates the ultrasonic wave transit time based on the following formula:

$$\begin{aligned} Tm &= [(T1+T2)/2 + ((T3+T4)/2 - Tx)]/2 \\ &= NTr + T\_123 - (t1+t2+t3+t4)/4. \end{aligned}$$

Here Tx is the period of the received ultrasonic signal. The center of T3 and T4 is always one period away from the center of T1 and T2. T_123 is expressed as following.

$$T\_123 = (3N1 + 2N2 + N3)Tr/4 - Tx/2.$$

Figure 7A:
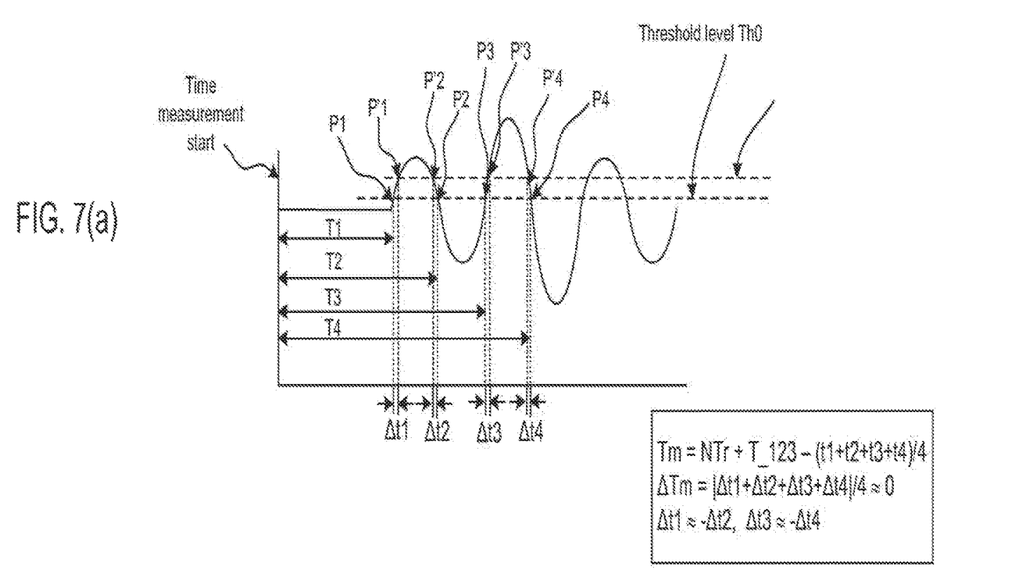
FIG. 7(a) illustrates the transit time measurement error reduction of the second embodiment of the present disclosure against threshold level fluctuation interference.
Figure 7B:
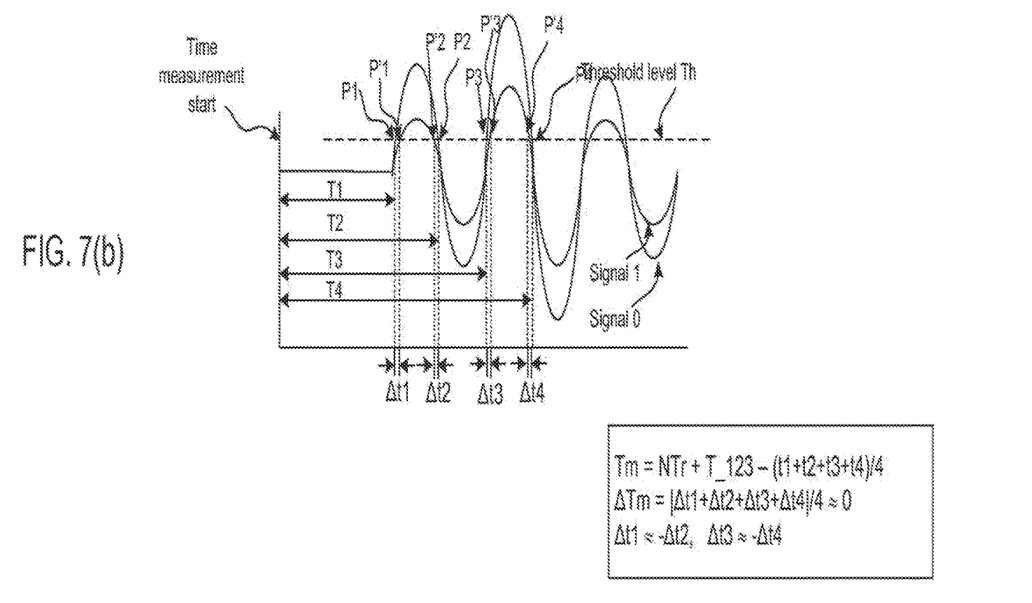
FIG. 7(b) illustrates the transit time measurement error reduction of the second embodiment of the present disclosure against signal amplitude fluctuation interference.

FIG. 7 illustrates the transit time measurement error of the second embodiment of the present disclosure. In this case the time measurement error is:

$$\Delta Tm = |\Delta t1 + \Delta t2 + \Delta t3 + \Delta t4|/4.$$

Since ($\Delta t1$, $\Delta t2$) and ($\Delta t3$, $\Delta t4$) change in opposite directions, their average is always smaller than $|\Delta t1|$. This indicates that the ultrasonic wave transit time measurement accuracy is greatly improved using the method of the present disclosure compared to the method of prior art.

Figure 8:
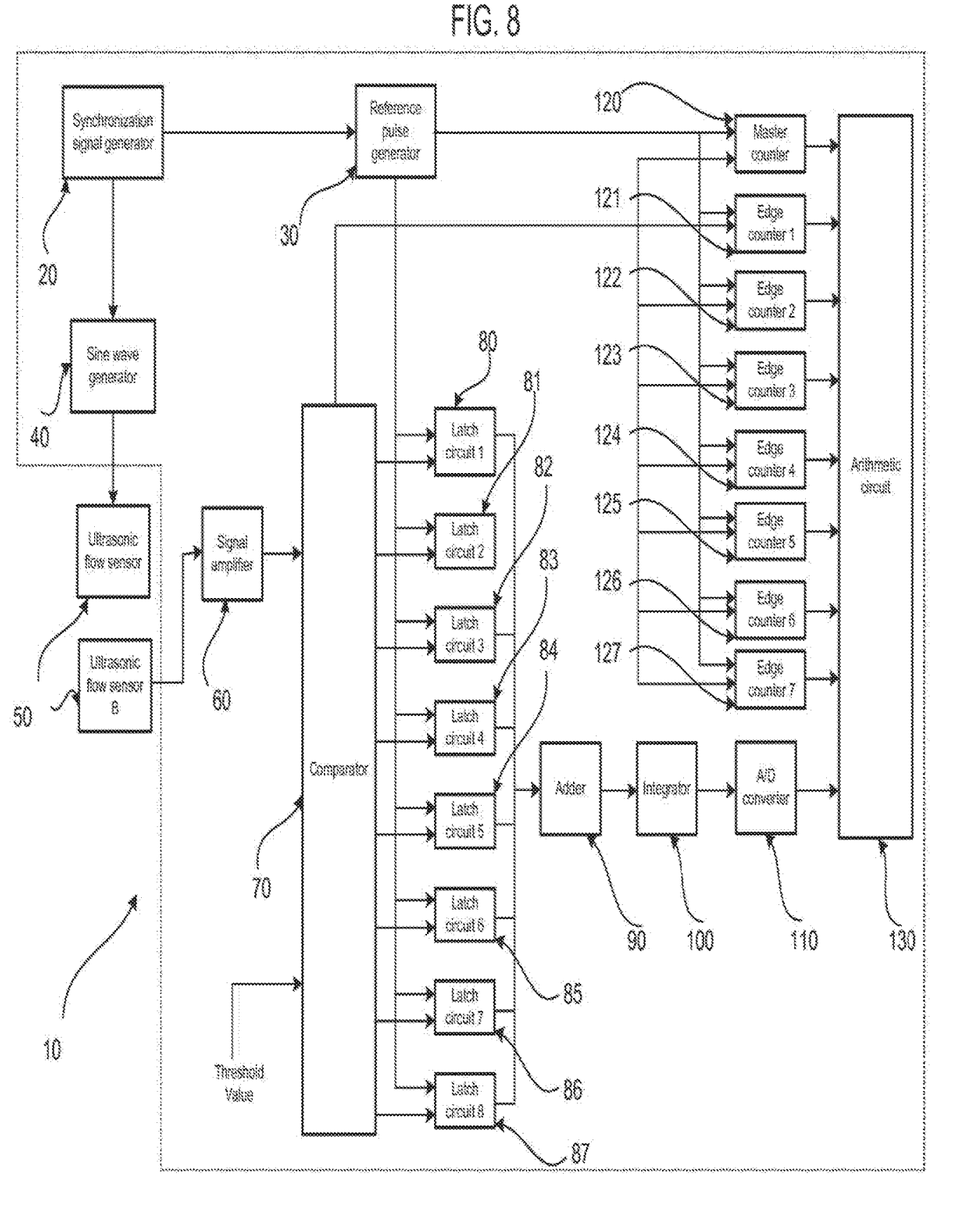
FIG. 8 shows a block diagram of the third embodiment of a device for measurement of the ultrasonic wave transit times of the present disclosure.

FIG. 8 illustrates the third embodiment of an electronic device for measuring the ultrasonic wave transit times of the present disclosure. In this embodiment, the device 10 consists of a synchronization signal generator 20, a reference pulse generator 30, a sine wave generator 40, an analog signal amplifier 60, a comparator 70, eight latch circuits 80-87, a digital adder 90, an integrator 100, an A/D converter 110, a master counter 120, seven edge counters 121-127, and an arithmetic circuit 130.

Figure 9:
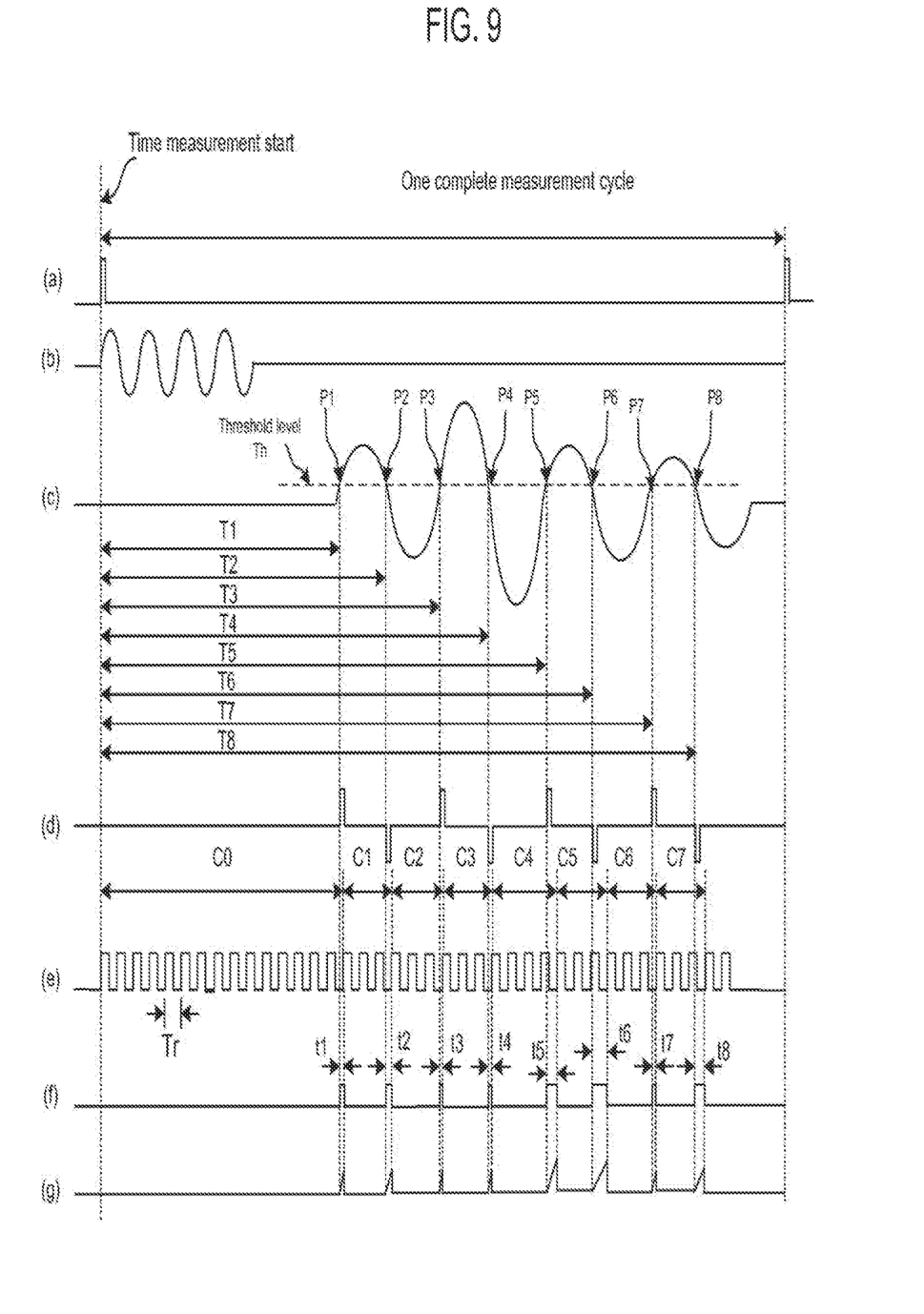
FIG. 9 shows the operational waveform diagram of the device shown in FIG. 8.

Referring to FIGS. 8 and 9, the synchronization signal generator 20 outputs a pulse shown in FIG. 9a. This pulse is used to perform the following functions: 1) initiating the measurement cycle, 2) triggering the sine wave generator 40 to start sending sine wave signal to the transmitter of the ultrasonic flow sensor 50, 3) triggering the reference pulse generator 30 to start generating high frequency clock signal, and 4) commanding the master counter 120 to start counting the reference clock cycles.

Referring to FIGS. 8 and 9, after receiving the synchronization pulse, the reference pulse generator 30 starts sending high frequency clock signal to: 1) the master counter 120, 2) the edge counters 121-127, and 3) the latch circuits 80-87, as shown in FIG. 9e.

Referring to FIGS. 8 and 9, after receiving the synchronization pulse, the sine wave generator 40 starts sending sine wave signals (FIG. 9b) to the transmitter of the ultrasonic flow sensor 50. After certain period of time delay, the sine wave signal arrives at the receiver of the ultrasonic flow sensor 50 with modulated amplitude, as shown in FIG. 9c.

Referring to FIGS. 8 and 9, the AC-coupled analog signal amplifier 60 amplifies the output signal from the receiver of the ultrasonic flow sensor 50.

Referring to FIGS. 8 and 9, the comparator 70 compares the signal received from the analog signal amplifier 60 with the predefined threshold value. When the received signal becomes higher than the threshold value, it outputs a positive pulse. On the other hand, when the received signal becomes lower than the threshold value, it outputs a negative pulse, as shown in FIG. 9d.

Referring to FIGS. 8 and 9, after receiving the positive pulse from the comparator 70, the master counter 120 stops counting the reference clock, as shown in FIG. 9e. The time interval C0, measured by the master counter 120 can be described by the equation:

$$C0 = NTr,$$

where N is the output of the mater counter 120, Tr is the period of the reference clock. The master counter 120 can only count complete clock cycles, its output N is a positive integer number, any time less than one clock cycle will not be counted.

Referring to FIGS. 8 and 9, after receiving the first positive pulse from the comparator 70, the edge counter 121 starts counting the reference clock. After receiving the first negative pulse from the comparator 70, the edge counter 121 stops counting the reference clock, as shown in FIG. 9e. The time interval. C1, measured by the edge counter 121 can be described by the equation:

$$C1=N1Tr,$$

where N1 is the output of the counter 121. Similar to the master counter 120, the edge counter 121 can only count complete clock cycles, its output N1 is a positive integer number, any time less than one clock cycle will not be counted.

Referring to FIGS. 8 and 9, after receiving the first negative pulse from the comparator 70, the edge counter 122 starts counting the reference clock. After receiving the second positive pulse from the comparator 70, the edge counter 122 stops counting the reference clock, as shown in FIG. 9e. The time interval, C2, measured by the edge counter 122 can be described by the equation:

$$C2=N2Tr,$$

where N2 is the output of the counter 122. Similar to the master counter 120, the edge counter 122 can only count complete clock cycles, its output N2 is a positive integer number, any time less than one clock cycle will not be counted.

Referring to FIGS. 8 and 9, after receiving the second positive pulse from the comparator 70, the edge counter 123 starts counting the reference clock.
After receiving the second negative pulse from the comparator 70; the edge counter 123 stops counting the reference clock, as shown in FIG. 9e. The time interval, C3, measured by the edge counter 123 can be described by the equation:

$$C3=N3Tr,$$

where N3 is the output of the counter 123. Similar to the master counter 120, the edge counter 123 can only count complete clock cycles, its output N3 is a positive integer number, any time less than one clock cycle will not be counted.

Referring to FIGS. 8 and 9, after receiving the second negative pulse from the comparator 70, the edge counter 124 starts counting the reference clock. After receiving the third positive pulse from the comparator 70, the edge counter 124 stops counting the reference clock, as shown in FIG. 9e. The time interval, C4, measured by the edge counter 124 can be described by the equation:

$$C4=N4Tr,$$

where N4 is the output of the counter 124. Similar to the master counter 120, the edge counter 124 can only count complete clock cycles, its output N4 is a positive integer number, any time less than one clock cycle will not be counted.

Referring to FIGS. 8 and 9, after receiving the third positive pulse from the comparator 70, the edge counter 125 starts counting the reference clock. After receiving the third negative pulse from the comparator 70, the edge counter 125 stops counting the reference clock, as shown in FIG. 9e. The time interval, C5, measured by the edge counter 125 can be described by the equation:

$$C5=N5Tr,$$

where N5 is the output of the counter 125. Similar to the master counter 120, the edge counter 125 can only count complete clock cycles, its output N5 is a positive integer number, any time less than one clock cycle will not be counted.

Referring to FIGS. 8 and 9, after receiving the third negative pulse from the comparator 70, the edge counter 126 starts counting the reference clock. After receiving the fourth positive pulse from the comparator 70, the edge counter 126 stops counting the reference clock, as shown in FIG. 9e. The time interval, C6, measured by the edge counter 126 can be described by the equation:

$$C6=N6Tr,$$

where N6 is the output of the counter 126. Similar to the master counter 120, the edge counter 126 can only count complete clock cycles, its output N6 is a positive integer number, any time less than one clock cycle will not be counted.

Referring to FIGS. 8 and 9, after receiving the fourth positive pulse from the comparator 70, the edge counter 127 starts counting the reference clock. After receiving the fourth negative pulse from the comparator 70, the edge counter 127 stops counting the reference clock, as shown in FIG. 9e. The time interval, C7, measured by the edge counter 127 can be described by the equation:

$$C7=N7Tr,$$

where N7 is the output of the counter 127. Similar to the master counter 120, the edge counter 127 can only count complete clock cycles, its output N7 is a positive integer number, any time less than one clock cycle will not be counted.

Referring to FIGS. 8 and 9, the latch circuit 80 is used to measure the time interval t1 between the first positive pulse from the comparator 70 and the first upward edge of the reference dock fed into the edge counter 121, as shown in FIG. 9f. Since time interval t1 is less than one complete reference clock, it cannot be measured by the master counter 120.

Referring to FIGS. 8 and 9, the latch circuit 81 is used to measure the time interval t2 between the first negative pulse from the comparator 70 and the first upward edge of the reference clock fed into the edge counter 122, as shown in FIG. 9f. Since time interval t2 is less than one complete reference clock, it cannot be measured by the edge counter 121.

Referring to FIGS. 8 and 9, the latch circuit 82 is used to measure the time interval t3 between the second positive pulse from the comparator 70 and the first upward edge of the reference clock fed into the edge counter 123, as shown in FIG. 9f. Since time interval t3 is less than one complete reference clock, it cannot be measured by the edge counter 122.

Referring to FIGS. 8 and 9, the latch circuit 83 is used to measure the time interval t4 between the second negative pulse from the comparator 70 and the first upward edge of the reference clock fed into the edge counter 124, as shown in FIG. 9f. Since time interval t4 is less than one complete reference clock, it cannot be measured by the edge counter 123.

Referring to FIGS. 8 and 9, the latch circuit 84 is used to measure the time interval t5 between the third positive pulse from the comparator 70 and the first upward edge of the reference clock fed into the edge counter 125, as shown in FIG. 9f. Since time interval 15 is less than one complete reference clock, it cannot be measured by the edge counter 124.

Referring to FIGS. 8 and 9, the latch circuit 85 is used to measure the time interval t6 between the third negative pulse from the comparator 70 and the first upward edge of the reference clock fed into the edge counter 126, as shown in FIG. 9f. Since time interval t6 is less than one complete reference clock, it cannot be measured by the edge counter 125.

Referring to FIGS. 8 and 9, the latch circuit 86 is used to measure the time interval t7 between the fourth positive pulse from the comparator 70 and the first upward edge of the reference clock fed into the edge counter 127, as shown in FIG. 9f. Since time interval t7 is less than one complete reference clock, it cannot be measured by the edge counter 126.

Referring to FIGS. 8 and 9, the latch circuit 87 is used to measure the time interval t8 between the fourth negative pulse from the comparator 70 and the upward edge of the next reference clock after the edge counter 127 is stopped, as shown in FIG. 9f. Since time interval t8 is less than one complete reference clock, it cannot be measured by the edge counter 127.

Referring to FIG. 8, the outputs of the latch circuits 80-87 are fed into the adder circuit 90. They are added together and then output to the integrator circuit 100.

Referring to FIGS. 8 and 9, since the time intervals t1-t8 from the latch circuits 80-87 are short pulses, the integrator circuit 100 is used to convert these short pulses to triangular waves, as shown in FIG. 9g.

Referring to FIG. 8, the analog signal from the integrator 100 is then converted to a digital value by the A/D converter 110, and fed into the arithmetic circuit 130.

Referring to FIG. 9, the arriving time of the ultrasonic wave, T1, measured at the first measurement point P1, can be described by the equation:

$$T1 = C0 - t1 = NTr - t1.$$

Referring to FIG. 9, The arriving time of the ultrasonic wave, T2, measured at the second measurement point P2, can be described by the equation:

$$T2 = C0 + C1 - t2 = (N+N1)Tr - t2.$$

Referring to FIG. 9, The arriving time of the ultrasonic wave, T3, measured at the third measurement point P3, can be described by the equation:

$$T3 = C0 + C1 + C2 - t3 = (N + N1 + N2)Tr - t3.$$

Referring to FIG. 9, The arriving time of the ultrasonic wave, T4, measured at the fourth measurement point P4, can be described by the equation:

$$T4 = C0 + C1 + C2 + C3 - t4 = (N + N1 + N2 + N3)Tr - t4.$$

Referring to FIG. 9, The arriving time of the ultrasonic wave, T5, measured at the fourth measurement point P5, can be described by the equation:

$$T5 = C0 + C1 + C2 + C3 + C4 - t5$$
$$= (N + N1 + N2 + N3 + N4)Tr - t5.$$

Referring to FIG. 9, The arriving time of the ultrasonic wave. T6, measured at the fourth measurement point P6, can be described by the equation:

$$T6 = C0 + C1 + C2 + C3 + C4 + C5 - t6$$
$$= (N + N1 + N2 + N3 + N4 + N5)Tr - t6.$$

Referring to FIG. 9, The arriving time of the ultrasonic wave, T7, measured at the fourth measurement point P7, can be described by the equation:

$$T7 = C0 + C1 + C2 + C3 + C4 + C5 + C6 - t7$$
$$= (N + N1 + N2 + N3 + N4 + N5 + N6)Tr - t7.$$

Referring to FIG. 9, The arriving time of the ultrasonic wave, T8, measured at the fourth measurement point P8, can be described by the equation:

$$T8 = C0 + C1 + C2 + C3 + C4 + C5 + C6 + C7 - t8$$
$$= (N + N1 + N2 + N3 + N4 + N5 + N6 + N7)Tr - t8.$$

Referring to FIG. 8, the arithmetic circuit 130 calculates the ultrasonic wave transit time based on the following formula:

$$Tm = [(T1 + T2)/2 + (T3 + T4)/2 - Tx +$$
$$(T5 + T6)/2 - 2Tx + (T7 + T8)/2 - 3Tx]/4$$
$$= (T1 + T2 + T3 + T4 + T5 + T6 + T7 + T8)/8 - 1.5Tx$$
$$= NTr + T\_1\_8 - (t1 + t2 + t3 + t4 + t5 + t6 + t7 + t8)/8.$$

Here Tx is the period of the received ultrasonic signal. The center of T3 and T4 is always one period away from the center of T1 and T2. Similarly, the center of T5 and T6 is always one period away from the center of T3 and T4, and etc. The term T_1_8 can be expressed as follows, $$T\_1\_8 = (7N1 + 6N2 + 5N3 + 4N4 + 3N5 + 2N6 + N7)Tr/8 - 1.5Tx.$$

Figure 10:
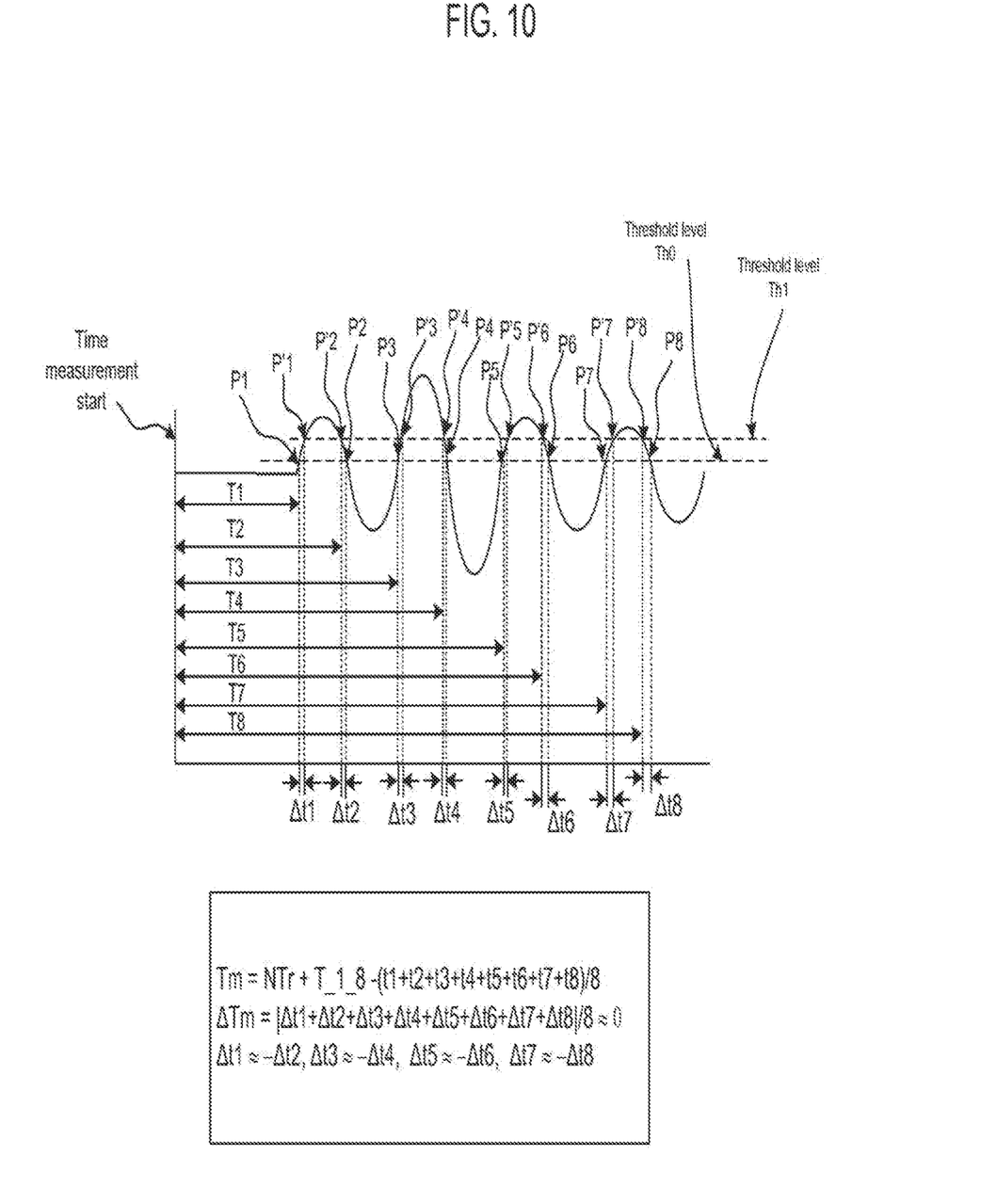
FIG. 10 illustrates the transit time measurement error reduction of the third embodiment of the present disclosure.

FIG. 10 illustrates the transit time measurement error of the third embodiment of the present disclosure. In this case the time measurement error is:

$$\Delta Tm = |t1 + \Delta t2 + \Delta t3 \Delta t4 + \Delta t5 + \Delta t6 + \Delta t7 \Delta t8|/8.$$

($\Delta$t1, $\Delta$t2), ($\Delta$t3, $\Delta$t4), ($\Delta$t5, $\Delta$t6), and ($\Delta$t7, $\Delta$t8) change in opposite directions. As a result, their average is always smaller than |$\Delta$t1|. In effect, $\Delta$Tm=0. This indicates that the ultrasonic wave transit time measurement accuracy is greatly improved using the method of the present disclosure compared to the method of prior art.

Noise in the received signal could cause threshold triggering error, thus, cause transit time measurement error. However, with multiple triggering mechanisms as illustrated in FIGS. 7 and 10, the transit times obtained at each triggering point are averaged to provide a result with reduced error. This not only makes the whole system more robust, but also improves the transit-time measurement accuracy, thus, the flow velocity accuracy, significantly.

What is claimed is:

1. A method for measuring the transit time of an ultrasonic wave transmitted from a first flow sensor to a second flow sensor, the method comprising the steps of:

(a) transmitting a wave signal from the first flow sensor to the second flow sensor, the wave signal having a first period;

(b) commencing a reference clock signal upon transmission of the wave signal from the first flow sensor to the second flow sensor, the reference clock signal having a fixed cycle;

(c) receiving a modulated version of the wave signal by the second flow sensor, the modulated version of the wave signal having a second period;

(d) generating a plurality of pulses, each pulse being generated when the modulated version of the wave signal received by the second flow sensor crosses a threshold amplitude level, the plurality of pulses including a sequence of successive pairs of alternating positive and negative pulses as the modulated version of the wave signal crosses the threshold amplitude level in both directions;

(e) establishing a time for each of the plurality of pulses using the reference clock signal; and (f) calculating a measured transit time of the wave signal transmitted from the first flow sensor to the second flow sensor by averaging together the times for a first successive pair of alternating positive and negative pulses to yield a first average transit time.

2. The method as claimed in claim 1 wherein, in the calculating step, the times for a second successive pair of alternating positive and negative pulses are averaged together and reduced by the second period of the modulated version of the wave signal to yield a second average transit time.

3. The method as claimed in claim 2 wherein, in the calculating step, the first average transit time and the second average transit time are averaged together to yield the measured transit time.

4. The method as claimed in claim 3 wherein, in the calculating step, the measured transit time is adjusted to compensate for time measurement errors against the reference clock signal.

5. The method as claimed in claim 4 wherein, in the calculating step, a time interval is measured for each of the plurality of pulses against the next cycle of the reference clock signal to yield a pulse signal deviation.

6. The method as claimed in claim 5 wherein a plurality of latch circuits is used to measure the time interval between each of the plurality of pulses and the next cycle of the reference clock signal.

7. The method as claimed in claim 6 wherein each of the plurality of latch circuits is assigned to measure the time interval for a corresponding pulse.

8. The method as claimed in claim 5 wherein, in the calculating step, the plurality of pulse signal deviations is averaged together to yield an average time measurement error.

9. The method as claimed in claim 8 wherein, in the calculating step, the measured transit time is adjusted by the average time measurement error to yield a compensated transit time.

10. The method as claimed in claim 1 wherein, in the pulse generating step, a positive pulse is generated when the modulated version of the wave signal becomes greater than the threshold amplitude level.

11. The method as claimed in claim 10 wherein, in the pulse generating step, a negative pulse is generated when the modulated version of the wave signal becomes less than the threshold amplitude level.

* * * * *